United States Patent [19]

Yamanishi et al.

[11] Patent Number: 5,264,498
[45] Date of Patent: Nov. 23, 1993

[54] POLYCARBONATE RESIN COMPOSITION

[75] Inventors: Noboru Yamanishi; Koji Hashimoto, both of Matsuyama, Japan

[73] Assignee: Teijin Chemicals, Ltd., Tokyo, Japan

[21] Appl. No.: 830,847

[22] Filed: Feb. 4, 1992

[30] Foreign Application Priority Data

Feb. 5, 1991 [JP] Japan ..................... 3-35315

[51] Int. Cl.$^5$ ..................... C08L 69/00; C08G 64/04
[52] U.S. Cl. ..................... 525/462; 528/196; 528/199
[58] Field of Search ................. 525/462; 528/196, 199

[56] References Cited

U.S. PATENT DOCUMENTS

| | | | |
|---|---|---|---|
| 3,166,606 | 1/1965 | Reinking | 525/462 |
| 4,186,154 | 1/1980 | Binsack | 525/461 |
| 5,045,582 | 9/1991 | Hashimoto | 525/462 |

FOREIGN PATENT DOCUMENTS

| | | | |
|---|---|---|---|
| 390064 | 10/1990 | European Pat. Off. | |
| 045945 | 4/1981 | Japan | 525/462 |

*Primary Examiner*—David J. Buttner
*Attorney, Agent, or Firm*—Sherman and Shalloway

[57] ABSTRACT

There is provided a polycarbonate resin composition having improved melt properties without impairing mechanical properties and transparency inherent in a polycarbonate resin, and suited for blow molding. This polycarbonate resin composition comprises (A) a polycarbonate resin having a weight-average molecular weight of 13,000 to 35,000 and (B) an ultrahigh-molecular-weight polycarbonate resin having a weight-average molecular weight of 175,000 to 300,000 and a low content of gels, and has improved flowability and structural viscosity index.

6 Claims, 1 Drawing Sheet

POLYCARBONATE RESIN COMPOSITION

This invention relates to a polycarbonate resin composition having markedly improved melt properties while maintaining mechanical properties and transparency which are merits of a polycarbonate resin.

Polycarbonate resins have been utilized in many fields owing to excellent electrical and mechanical properties. However, the polycarbonate resins are low in melt viscosity and show a Newtonian flow behavior under melt processing conditions. Such a flow behavior becomes a serious defect in a certain molding process. For example, in blow molding, a parison is easy to drow down, making hard the blow molding of large-sized hollow articles. In such a blow molding, polycarbonate resins are required which show a non-Newtonian flow behavior under melt processing conditions and are hard to draw down.

As a method for improving melt properties of a polycarbonate resin, there are proposed a method in which a trihydric or higher phenol is copolymerized to form a branched polycarbonate (Japanese Laid-open Patent Application No. 693/1973), and a method in which polycarbonate resins different in molecular weight are mixed (Japanese Patent Publication No. 57860/1986, Japanese Laid-open Patent Application Nos. 45,941/1981 and 138,154/1983, etc.). The branched polycarbonate resin suffers problems, however, that it is hard to purify and contains unreacted substances or by-products, the resulting molded article is easy to discolor, and conditions in a process are hardly determined, making it difficult to produce the branched polycarbonate resin stably. In the method wherein the two polycarbonate resins are mixed, small amounts thereof cannot improve melt properties because their molecular weights are relatively close to each other. In order to fully improve the melt properties, large amounts thereof are needed, which results in decrease of excellent mechanical properties of the polycarbonate resins. For this reason, it has not yet been put to practical use.

An object of this invention is to improve melt properties without impairing mechanical properties and transparency inherent in a polycarbonate resin.

The present inventors have made assiduous studies to achieve the above object, and consequently, have found that when an ordinary polycarbonate resin subjected to melt molding is blended with a specific amount of an ultrahigh-molecular-weight polycarbonate resin having a weight-average molecular weight of 175,000 or more, melt properties can be surprisingly improved without impairing mechanical properties. However, as burn mark occurs in the molded article containing such an ultrahigh-molecular-weight polycarbonate resin, it could not be put to practical use. As a result of their further studies over this problem, it has been discovered that burn mark which occurs in the molded article is ascribable to gels of the ultrahigh-molecular-weight polycarbonate resin. Their still further studies based on the discovery have led to completion of this invention.

Thus, according to this invention, there is provided a polycarbonate resin composition comprising (A) 100 parts by weight of a polycarbonate resin having a weight-average molecular weight of 13,000 to 35,000 and (B) 5 to 25 parts by weight of a ultrahigh-molecular-weight polycarbonate resin having a weight-average molecular weight of 175,000 to 300,000, the number of gels left on a filter having a hole diameter of 20 microns when a methylene chloride solution of the ultrahigh-molecular-weight polycarbonate resin is subjected to spontaneous filtration with said filter being not more than 300 per kg of the ultrahigh-molecular-weight polycarbonate resin, and structural viscosity index N found by an equation $Q = K \cdot p^N$ [wherein Q is outflow amount (ml/sec) of a molten resin, K is a constant, p is a pressure (kg/cm$^2$) and N is structural viscosity index] being not lower than 1.6.

The weight-average molecular weight here referred to is a value measured by a light scattering method.

Melt properties of the polycarbonate resin can be evaluated with structural viscosity index N found by the equation $Q = K \cdot p^N$ wherein Q is fluidity (ml/sec) of a molten resin, K is a constant, p is a pressure (kg/cm$^2$) and N is structural viscosity index]. When N is 1, a Newtonian flow behavior is shown, and as N becomes higher, a non-Newtonian flow behavior is shown.

Structural viscosity index N of the ordinary polycarbonate resin subjected to melt molding is 1.2 to 1.3. While the polycarbonate resin composition of this invention features that its structural viscosity index N is not lower than 1.6.

The polycarbonate resin (A) used in this invention is an ordinary polycarbonate resin having a weight-average molecular weight of 13,000 to 35,000, preferably 16,000 to 30,000, and obtained by a solution method in which a dihydric phenol and phosgene are reacted in an inert solvent in the presence of an end blocking agent and an acid acceptor or a melting method in which a dihydric phenol and diphenyl carbonate are reacted in a molten state. It is advisable that the dihydric phenol used here is 2,2-bis(4-hydroxyphenyl)propane (bisphenol A). A part or the whole thereof may be replaced with another dihydric phenol. Examples of another dihydric phenol are 4,4'-dihydroxydiphenyl, hydroquinone, 1,1-bis(4-hydroxyphenyl)ethane, 1,1-bis(4-hydroxyphenyl)-1-phenylethane, 1,1-bis(4-hydroxyphenyl)cyclohexane, 2,2-bis(4-hydroxy-3,5-dimethylphenyl)propane, bis(hydroxyphenyl)ethers, bis(hydroxyphenyl)ethers, bis(hydroxyphenyl)sulfones, bis(hydroxyphenyl)sulfides, bis(hydroxyphenyl)sulfoxides.

Components making up the ultrahigh-molecular-weight polycarbonate resin (B) can optionally be selected from the components shown with regard to the polycarbonate resin (A); the same components as those of the polycarbonate resin (A) are preferable.

As the ultrahigh-molecular-weight polycarbonate resin (B), an ultrahigh-molecular-weight polycarbonate resin which has a weight-average molecular weight of 175,000 to 300,000, preferably 180,000 to 250,000 and which cannot singly be subjected to melt molding, is available.

An ultrahigh-molecular-weight polycarbonate resin having a weight-average molecular weight of less than 175,000 has to be used in a large amount in order to improve melt properties, i.e., prevent drawdown in blow molding by making the structural viscosity index N not lower than 1.6. As a consequence, melt viscosity increases too much, molding becomes hard, and the resulting molded article is liable to permit uneven thickness and molding distortion and is decreased in mechanical properties, especially in tensile properties. When the amount is controlled for retaining the upper limit of melt viscosity and the mechanical properties in molding, structural viscosity index N becomes lower than 1.6, and improvement in melt properties is insufficient, making it impossible to prevent drawdown in blow molding. Moreover, when using an ultrahigh-molecular-weight polycarbonate resin having a weight-average molecular weight of higher than 300,000, its amount has to be controlled for maintaining the upper limit of melt viscosity and mechanical properties. Consequently, structural viscosity index N becomes lower than 1.6, and improvement of melt properties is insufficient, making it impossible to prevent drawdown in blow molding.

In this invention, the content of gels in the ultrahigh-molecular-weight polycarbonate resin (B) has to be such that the number of gels left on a filter having a hole diameter of 20 microns when a methylene chloride solution of 7% by weight of the ultrahigh-molecular-weight polycarbonate resin is subjected to spontaneous filtration with said filter is not more than 300 per kg of the ultrahigh-molecular-weight polycarbonate resin. When blending an ultrahigh-molecular-weight polycarbonate resin (B) having a content of gels that exceeds the above range, burn mark comes to occur in a molded article resulting from blow molding. Since conditions under which to form the ultrahigh-molecular-weight polycarbonate resin (B) become severe, gels tend to be formed; because of quite high melt viscosity, an adverse effect of gels is heavily developed.

The ultrahigh-molecular-weight polycarbonate resin (B) having such a low content of gels can hardly be produced by a method for producing the ordinary polycarbonate resin (A) in which an alkaline aqueous solution of a dihydric phenol is reacted with phosgene in the presence of methylene chloride and a polycondensation reaction is carried out in the presence or absence of a catalyst, because the content of gels is increased. It can be produced, for example, by making the concentration of the reaction product in the methylene chloride layer after the reaction with the phosgene 20 to 35 % by weight, adding methylene chloride between the termination of the reaction with phosgene and the addition of the catalyst to make the concentration of the reaction product in the methylene chloride layer 10 to 15% by weight, and further adding methylene chloride after the addition of the catalyst to make the concentration of the reaction product in the methylene chloride layer 2 to 8% by weight. The catalyst used here is not limited in particular, and any catalyst used to produce a polycarbonate resin will do. Examples thereof are tertiary amines such as triethylamine, and triethylbenzylammonium chloride, and a quaternary ammonium salt. Moreover, an end blocking agent is used to adjust a degree of polymerization. The end blocking agent is not limited in particular either. Examples thereof are monohydric phenols such as phenol and p-tert-butyl phenol. The end blocking agent may be added either in the reaction with phosgene or in the polycondensation reaction.

When the amount of the ultrahigh-molecular-weight polycarbonate resin (B) is too small, structural viscosity index N becomes lower than 1.6, and improvement of melt properties is insufficient. When the amount of said resin is too large, structural viscosity index N becomes higher than 1.6, but melt viscosity increases, molding becomes difficult and mechanical properties decrease. The amount of said resin is 5 to 25 parts by weight, preferably 7 to 20 parts by weight per 100 parts by weight of the polycarbonate resin (A).

The composition of this invention can be produced by any method, e.g., a method in which a given amount of a powdery polycarbonate resin (A) is mixed with a given amount of a powdery ultrahigh-molecular-weight polycarbonate resin (B), or a method in which a solution of the polycarbonate resin (A) or of the ultra-high-molecular-weight polycarbonate resin (B) is mixed with a solution or a powder of the remaining component.

The composition of this invention can contain additives such as a fire retardant, an antistatic agent, a mold release agent, a dyestuff, a heat stabilizer, and an ultraviolet stabilizer, as required, in such amounts that the object of this invention is not deviated from. Unless transparency is required, an inorganic filler and a fibrous reinforcing agent may be contained therein.

The following Referential Examples, Examples and Comparative Examples illustrate this invention more specifically.

Parts and % in said Examples are all by weight.

Figure 1:
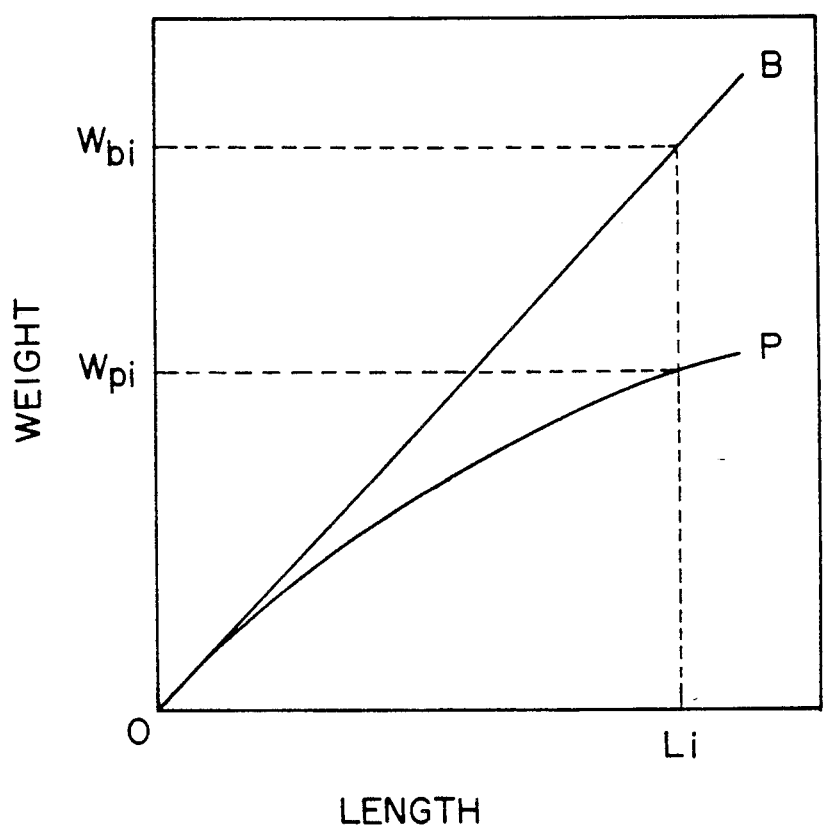
FIG. 1 attached is a graph used to measure drawdown property in said Examples.

The properties are evaluated as follows.

Structural viscosity index N:

Dry pellets were charged into a cylinder of a Koka-type flow tester (manufactured by Shimadzu Seisakusho K.K.), and a temperature was kept at 280° C. An applied pressure P (100 to 180 kg/cm$^2$) and an outflow amount Q (ml/sec) of each molten resin were measured. The respective values were plotted in a log-log graph. Structural viscosity index N was found from a gradient of a regression line in said graph.

Drawdown property

Using an extruder having a screw diameter of 30 mm, a nozzle inner diameter of 4 mm and a land length of 25 mm, an extrusion length of a thread was measured from 5 cm under the nozzle of the extruder in such conditions that a cylinder temperature was 270° C. and a rotational speed was 20 rpm. Weights corresponding respectively to thread lengths of 5 cm, 10 cm, 15 cm, 20 cm, 30 cm and 40 cm were measured. As shown in FIG. 1 attached hereto, the thread length was plotted in the abscissa, and the weight in the ordinate to draw a curve OP. A tangential line OB is drawn from the origin. Drawdown property was found by the following equation.

$$Drawdown\ property\ (\%) = [(W'_{bi} - W'_{pi})/W'_{bi}] \times 100$$

wherein $W_{pi}$ is a weight corresponding to a thread length Li, and $W_{bi}$ is a weight of a point of intersection with the tangential line OB corresponding to the thread length Li.

Tensile strength at break

Tensile strength at break was measured according to ASTM D-638. It is preferably 700 kgf/cm$^2$.

Color tone

A color tone was indicated by a b value measured with a color differential meter AUD-CH-2 (manufactured by Suga Shikenki Ltd.) according to JIS K-7105.

REFERENTIAL EXAMPLE 1

Production of a polycarbonate resin (A)

Phosgenation reaction

One hundred parts of bisphenol A were dissolved in 550 parts of a 10% sodium hydroxide aqueous solution under a nitrogen stream, and 320 parts of methylene chloride were added to the solution. While stirring the mixture at 20° C, 50 parts of phosgene were blown over a period of 100 minutes to conduct the phosgenation reaction. During this time, a 15 % sodium hydroxide aqueous solution was added to adjust pH of the aqueous layer to 12 to 14. When the reaction was over, the concentration of the reaction product in the methylene chloride layer was 25%.

Polycondensation reaction

Subsequently, the mixture was vigorously stirred to form a uniform emulsion. Then, while pH of the aqueous layer was adjusted to 13 with the addition of a 15% sodium hydroxide aqueous solution, 2 parts of p-tert-butyl phenol as an end blocking agent, 0.2 part of triethylamine as a catalyst and 630 parts of methylene chloride were added, and the polycondensation reaction was carried out at 30° C. for 3 hours. When the reaction was over, the concentration of the reaction product in the methylene chloride layer was 15 %. After the reaction, the aqueous layer was separated, and the organic layer was well washed with water, concentrated, and dried to obtain a polycarbonate resin. A weight-average molecular weight of the obtained polycarbonate resin was 29,700, and the number of gels was 84 per kg of said resin. Separately, a polycarbonate resin having a weight-average molecular weight of 21,800 was formed as above except changing the amount of p-tert-butyl phenol into 1.9 parts.

REFERENTIAL EXAMPLE 2

Production of an ultrahigh-molecular-weight polycarbonate resin (B)

Phosgenation reaction

One hundred parts of bisphenol A were dissolved in 550 parts of a 10% sodium hydroxide aqueous solution under a nitrogen stream, and 320 parts of methylene chloride were added to the solution. While stirring the mixture at 25° C., 50 parts of phosgene were blown over a period of 100 minutes. During this time, pH of the aqueous layer was adjusted to 12 to 14 with the addition of a 15% sodium hydroxide aqueous solution. After the reaction was over, the concentration of the reaction product in the methylene chloride layer was 25%.

Polycondensation reaction

Then, with vigorous stirring, 550 parts of methylene chloride were added to form a uniform emulsion. At this time, the concentration of the reaction product in the methylene chloride layer was 11 %. Subsequently, while pH of the aqueous layer was adjusted to 13 with the addition of a 15% sodium hydroxide aqueous solution, 0.2 part of p-tert-butyl phenol as an end blocking agent, 0.2 part of triethylamine as a catalyst and 550 parts of methylene chloride were added. At this time, the concentration of the reaction product in the methylene chloride layer was 7%. Ten minutes later, 550 parts of methylene chloride were further added to make the concentration of the reaction product in the methylene chloride layer 5%. Further, 10 minutes later, 550 parts of methylene chloride were added, and the polycondensation reaction was carried out at 30° C. for 3 hours. After the reaction was over, the concentration of the reaction product in the methylene chloride layer was 4%. After the reaction, the aqueous layer was separated, and the organic layer was well washed with water, concentrated, and added dropwise to methanol to obtain a polycarbonate resin as a precipitate. The polycarbonate resin obtained by drying the precipitate had a weight-average molecular weight of 212,000 and contained 163 gels per kg of said resin. Separately, a polycarbonate resin having a weight-average molecular weight of 70,500 and containing 132 gels (per kg of said resin), and a polycarbonate resin having a weight-average molecular weight of 181,000 and containing 157 gels (per kg of said resin) were formed as above except that the amount of p-tert-butyl phenol was changed into 0.9 part and 0.3 part.

REFERENTIAL EXAMPLE 3

Production of an ultrahigh-molecular-weight polycarbonate resin (B) (having a high content of gels)

Phosgenation reaction

One hundred parts of bisphenol A were dissolved in 550 parts of a 10% sodium hydroxide aqueous solution under a nitrogen stream, and 320 parts of methylene chloride were added to the solution. With stirring, 50 parts of phosgene were added at 25° C. over a period of 100 minutes. During this time, a 15 % sodium hydroxide aqueous solution was added to adjust pH of the aqueous layer to 12 to 14. After the reaction was over, the concentration of the reaction product in the methylene chloride was 25%.

Polycondensation reaction

Subsequently, with vigorous stirring, 550 parts of methylene chloride were added to form a uniform emulsion. At this time, the concentration of the reaction product in the methylene chloride layer was 11 %. Then, while pH of the aqueous layer was adjusted to 13 with the addition of a 15% sodium hydroxide aqueous solution, 0.2 part of p-tert-butyl phenol as an end blocking agent, 0.2 part of triethylamine as a catalyst and 550 parts of methylene chloride were added. At this time, the concentration of the reaction product in the methylene chloride layer was 7%. The polycondensation reaction was performed at 30° C. for 3 hours. After the reaction was over, 1,100 parts of methylene chloride were added to make the concentration of the reaction product in the methylene chloride layer 4%. After the reaction was over, the aqueous layer was separated, and the organic layer was well washed with water, concentrated, and added dropwise to methanol to provide a polycarbonate resin as a precipitate. The polycarbonate resin obtained by drying had a weight-average molecular weight of 210,300 and contained 692 gels per kg of said resin.

EXAMPLES 1 to 3 and COMPARATIVE EXAMPLES 1 to 7

The polycarbonate resin (A) obtained in Referential Example 1 and each of the ultrahigh-molecular-weight polycarbonate resins (B) obtained in Referential Examples 2 and 3 were blended at a blending ratio shown in Table 1. Properties of the resulting compositions were evaluated, and the results are shown in Table 1. The value of gels in the ultrahigh-molecular-weight polycarbonate gel (B) is the number of gels per kg of the polymer.

| | Molecular weight of a polycarbonate resin (A) | Ultrahigh-molecular weight polycarbonate resin (B) | | Blending ratio A/B | Structural viscosity index N | Drawdown property (%) | | Tensile strength at break (kgf/cm$^2$) | Color tone (b value) |
| --- | --- | --- | --- | --- | --- | --- | --- | --- | --- |
| | | molecular weight | number of gels | | | 30 cm | 40 cm | | |
| Ex. 1 | 29,700 | 212,000 | 163 | 90/10 | 1.7 | 33.0 | 36.9 | 770 | 3.32 |
| CEx. 1 | " | 210,300 | 692 | 90/10 | 1.7 | 32.7 | 36.3 | 770 | 6.07 |
| Ex. 2 | 21,800 | 212,000 | 163 | 85/15 | 1.8 | 26.7 | 29.4 | 720 | 3.59 |
| CEx. 2 | " | 210,300 | 692 | 85/15 | 1.8 | 26.6 | 29.1 | 720 | 7.72 |
| Ex. 3 | 29,700 | 248,300 | 204 | 93/7 | 1.6 | 35.3 | 41.6 | 780 | 3.35 |
| CEx. 3 | " | 210,300 | 692 | 93/7 | 1.6 | 31.5 | 35.4 | 780 | 5.69 |
| CEx. 4 | 29,700 | 70,500 | 132 | 90/10 | 1.5 | 47.7 | 53.3 | 770 | 3.21 |
| CEx. 5 | 29,700 | 70,500 | 132 | 70/30 | 2.0 | 27.2 | 31.3 | 530 | 3.76 |
| CEx. 6 | 21,800 | 181,000 | 157 | 60/40 | 2.3 | 18.4 | 21.3 | 500 | 4.78 |
| CEx. 7 | 29,700 | — | — | 100/0 | 1.3 | 50.9 | 59.4 | 800 | 3.10 |

Ex. - Example
CEx. - Comparative Example

Since the polycarbonate resin composition of this invention shows excellent melt properties in blow molding, it is possible to easily produce a large-sized hollow article that has been so far hard to produce. Moreover, as it has mechanical properties and transparency which are merits of the polycarbonate resin, its industrial value is extremely high. The composition of this invention can also be subjected to melt moldings such as extrusion molding, injection molding and vacuum molding other than the blow molding.

What we claim is:

1. A polycarbonate resin composition consisting essentially of
    (A) 100 parts by weight of a polycarbonate resin having a weight-average molecular weight of 13,000 to 35,000 and
    (B) 5 to 25 parts by weight of a ultrahigh-molecular-weight polycarbonate resin having a weight-average molecular weight of 175,000 to 300,000, wherein a number of gels left on a filter having a hole diameter of 20 microns when a methylene chloride solution of the ultrahigh-molecular-weight polycarbonate resin is subjected to spontaneous filtration with said filter being not more than 300 per kg of the ultrahigh-molecular-weight polycarbonate resin;
    said polycarbonate resin composition having a structural viscosity index N not lower than 1.6, said structural viscosity index N being determined from a gradient of a regression line in a log-log plot of equation $Q = K \cdot p^N$ wherein Q is outflow amount (ml/sec), K is a constant, p is applied pressure (kg/cm$^2$) and N is structural viscosity index for Q values obtained in a Kōka flow tester at 280° C. for p values of 100 to 180 kg/cm$^2$.

2. The polycarbonate resin composition of claim 1 wherein the ultrahigh-molecular-weight resin (B) has a weight-average molecular weight of 180,000 to 250,000.

3. The polycarbonate resin composition of claim 1 comprising 100 parts by weight of the polycarbonate resin (A) and 7 to 20 parts by weight of the ultrahigh-molecular-weight polycarbonate resin (B).

4. A resin composition consisting of
    (I) a polycarbonate resin composition consisting of
        (A) 100 parts by weight of a polycarbonate resin having a weight-average molecular weight of 13,000 to 35,000, and
        (B) 5 to 25 parts by weight of a ultrahigh-molecular-weight polycarbonate resin having a weight-average molecular weight of 175,000 to 300,000, wherein a number of gels left on a filter having a hole diameter of 20 microns when a methylene chloride solution of the ultrahigh-molecular-weight polycarbonate resin is subjected to spontaneous filtration with said filter being not more than 300 per kg of the ultrahigh-molecular-weight polycarbonate resin,
        said polycarbonate resin composition having a structural viscosity index N not lower than 1.6, said structural viscosity index N being determined from a gradient of a regression line in a log-log plot of the equation $Q = K \cdot p^N$ wherein Q is outflow amount ml/sec), K is a constant, p is applied pressure (kg/cm$^2$) and N is structural viscosity index for Q values obtained in a Kōka flow tester at 280° C. for p values of 100 to 180 kg/cm$^2$; and, optionally,
    (II) at least one additive selected from the group consisting of an antistatic agent, a mold release agent, a dyestuff, a heat stabilizer, an ultraviolet stabilizer, an inorganic filler and a fibrous reinforcing agent.

5. The resin composition of claim 4, wherein the ultra-high-molecular-weight resin (B) has a weight-average molecular weight of 180,000 to 250,000.

6. The resin composition of claim 4, wherein the polycarbonate resin composition consists of 100 parts by weight of the polycarbonate resin (A) and 7 to 20 parts by weight of the ultrahigh-molecular-weight polycarbonate resin (B).

* * * * *